US005950669A

United States Patent [19]

Fehlmann et al.

[11] Patent Number: 5,950,669

[45] Date of Patent: Sep. 14, 1999

[54] PRESSURE VALVE

[75] Inventors: Wolfgang Fehlmann; Ruben-Sebstian Henning; Walter Fuchs, all of Stuttgart, Germany

[73] Assignee: Robert Bosch GmbH, Stuttgart, Germany

[21] Appl. No.: 09/026,410

[22] Filed: Feb. 19, 1998

[30] Foreign Application Priority Data

Feb. 20, 1997 [DE] Germany .......................... 197 06 591

[51] Int. Cl.[6] ................................................ F16K 17/26

[52] U.S. Cl. .................................. 137/493.3; 137/493.6; 137/493.9; 417/296; 123/467; 123/506

[58] Field of Search ............................. 137/493, 493.1, 137/493.2, 493.3, 493.4, 493.5, 493.6, 493.9; 123/506, 467; 417/296

[56] References Cited

U.S. PATENT DOCUMENTS 2,090,781 8/1937 Camner ............................ 137/493.9 X
4,056,120 11/1977 MacNeilage ......................... 137/493.9
4,459,086 7/1984 Hafele et al. .................... 137/493.5 X
4,648,369 3/1987 Wannenwetsch ................ 137/493.3 X
4,692,102 9/1987 Hafele et al. .................... 137/493.3 X
4,834,134 5/1989 Asami et al. ........................ 137/493.3
4,926,902 5/1990 Nakamura et al. .............. 137/493.6 X
4,969,697 11/1990 Lindenman ...................... 137/493.3 X
5,029,604 7/1991 Spector et al. ................... 137/493.9 X
5,293,897 3/1994 Warga et al. ........................ 137/493.3

FOREIGN PATENT DOCUMENTS 1033978 7/1958 Germany ............................ 137/493.9
1216682 12/1970 United Kingdom ................ 137/493.6
2292978 3/1996 United Kingdom .

*Primary Examiner*—Denise L. Ferensic
*Assistant Examiner*—Ramyar Farid
*Attorney, Agent, or Firm*—Edwin E. Greigg; Ronald E. Greigg

[57] ABSTRACT

The invention relates to a pressure valve for installation in a supply line between a pump work chamber of a fuel injection pump and an injection site in an internal combustion engine to be supplied thereby. A valve body is provided with a valve seat and has a through conduit in which a pressure valve closing member is guided. A check valve is disposed in a work chamber, wherein the check valve and the pressure valve closing member are movable relative to one another, in the through conduit. A restoring spring on the injection side causes the check valve to rest in the through bore and on the pump chamber side disposes the pressure valve closing member to the valve seat of the valve body.

20 Claims, 2 Drawing Sheets

PRESSURE VALVE

BACKGROUND OF THE INVENTION

The invention is based on a pressure valve for controlling fluid flow.

In one such pressure valve, known from German Patent Disclosure DE 42 40 302 A1, and disposed in a supply line between a pump work chamber and an injection site, a valve closing member is lifted from its valve seat counter to the force of a spring, causing the pressure valve to open, as a result of a medium which is at high pressure and is supplied to the pressure valve from the pump work chamber via the supply line. At the end of the high-pressure supply, the pressure valve closing member returns to its seat. At the same time, an injection valve at the injection site closes, so that in the enclosed volume between the pressure valve and the injection valve, pressure waves move back and forth and are capable of re-opening the injection valve. To prevent this, a check valve, guided with its closing member in the pressure valve closing member, ia disposed in the interior of the pressure valve closing member, and by way of it the pressure level in the supply line can be reduced, even after the closure of the pressure valve closing member, to a head pressure that is determined by the prestressing of the restoring spring of the check valve.

In the known pressure valve, the check valve is fixedly disposed relative to the pressure valve closing member, and there is a second through conduit in the pressure valve closing member, by way of which the returning medium can be diverted into the pump work chamber.

The known pressure valve has the disadvantage that because of this arrangement, not only is one restoring spring provided for the pressure valve closing member, which presses the pressure valve closing member into the valve seat of the valve body so that the first through conduit is closed from the pump work chamber to the injection valve, but a further restoring spring is also provided in the pressure valve closing member, which keeps the check valve in a closed position and as needed enables a return flow of the medium (after the injection feed pump stops). This makes for a complicated and expensive arrangement for a pressure valve.

The known pressure valve has the further disadvantage that because of the design and disposition of the pressure valve with two restoring springs in the pressure valve, large-volume portions of the through conduit are formed, so that a large idle volume is stored in the pressure valve. On the one hand, this makes it more difficult to build up pressure at the onset of fuel supply, and at the same time increased energy is needed for generating the high pressure.

OBJECT AND SUMMARY OF THE INVENTION

The pressure valve according to the invention has the advantage over the prior art that because of the disposition of the floatingly supported check valve in the pressure valve closing member, a simplified design of the pressure valve with only one restoring spring is made possible. It is also possible to reduce the idle volume in the pressure valve considerably, so that upon fuel supply a rapid pressure buildup is made possible while demanding little energy.

In an advantageous embodiment of the invention, it is provided that the valve seat of the check valve is disposed, toward the pump, on a piston which is slidingly received in the pressure valve closing member. By means of this guide portion of the piston, it is possible for the check valve to be moved coaxially to the pressure valve closing member. The piston also advantageously has a head portion, adjoining the guide portion, that in the transitional region forms a stop face which faces a stop face on the pressure valve closing member. This makes it possible, because of the pressure of a diversion shaft in the supply line after the medium has been supplied to the injection site, for there to be a return flow, in which first the piston is moved toward the pump work chamber before it comes into contact with the pressure valve closing member. As a result, an initial damping can be attained, thus considerably reducing the movement back and forth of pressure waves. If the pressure of the return-flowing medium rises further, the check valve can then open, so that the returning medium can flow out into the pump work chamber.

In another advantageous feature of the invention, a through bore with a throttle restriction is provided in the piston. As a result, further throttling of the returning medium can be provided for, as soon as the check valve opens.

In another advantageous feature of the invention, there is a portion of a stepped bore in a valve housing of the through conduit that has a stop bush of reduced diameter in the transitional region between the portion that receives the pressure valve and a longitudinal bore portion. As a result, a defined stop face is formed for the piston of the valve closing member that can reciprocate in the through conduit toward the injection site and the pump work chamber; this averts plastic deformations of the stop face, which cause a cross-sectional reduction and hence a hindrance to the flow.

In another advantageous feature of the invention, the piston has a slotted, preferably cross-slotted stop on its head portion. As a result, when the medium is pumped from the pump work chamber to the injection site, a high flow cross section is made possible, so that the requisite volume of the injection site can be made available.

In another advantageous feature of the invention, the pressure valve closing member is tubular, and on a through opening toward the pump chamber it has an inserted clamping bush, which forms a step in the pressure valve closing member on which the restoring spring can rest. As a result it can be possible for the restoring spring on the one hand to close the pressure valve closing member toward the valve seat of the valve body and on the other to dispose the check valve in a closed position to the valve seat on the piston. It is advantageously provided that the clamping bush is press-fitted, so that a secure support face for the restoring spring can be provided.

It is also advantageous provided that the spacing between the check valve and the clamping bush, disposed in the through bore of the pressure valve closing member, is adaptable as a function of the requisite conditions for the opening pressures of the pressure valve and of the check valve. As a result, for instance if there is a need for both the pressure valve closing member and the check valve to open only at very high pressures, to provide that the restoring spring is highly prestressed, while an only slight spacing is maintained between the clamping bush and the check valve. As an alternative, it may also be provided that a restoring spring with a higher spring constant can be used; as a result, once again a higher opening pressure is required for opening the pressure valve closing member as well as the check valve, and in that case the spacing between the clamping bush and the check valve can be made somewhat greater.

In this advantageous feature of the invention with the tubular pressure valve closing member, it is provided that the returning medium bathes the check valve and inside the pressure valve closing member flows past the spring windings of the restoring spring, and then via the opening in the clamping bush, which is disposed in a through bore of the pressure valve closing member, flows out to the pump chamber.

In another advantageous feature of the invention, the pressure valve closing member is cup-shaped, and the restoring spring engages the bottom of the pressure valve closing member toward the pump chamber. This makes for a simple design of the pressure valve closing member, and advantageously a guide for receiving the restoring spring is provided on the bottom of the cup-shaped pressure valve closing member.

In this advantageous embodiment of the invention, it is also provided that preferably a plurality of radially disposed openings are located in the region of the check valve in a shaft of the cup-shaped pressure valve closing member. As a result, upon a return flow of the medium and after the opening of the check valve, a fluidically favorable outflow of fuel via these openings into the through conduit between the valve body and the pressure valve closing member is made possible, and this flow can then proceed to the pump work chamber.

In this embodiment it is advantageously also provided that the check valve has a limited opening motion, and the valve closing member comes to rest on a stop disposed in the cup-shaped pressure valve closing member. The stop can advantageously also be embodied as a guide for the restoring spring. Both by means of this reciprocation stop and this flow guidance via the lateral openings in the pressure valve closing member, the durability of the restoring spring can be improved substantially.

In another advantageous feature of the invention, the opening pressure of the alternative embodiment with a cup-shaped pressure valve closing member is adjustable by means of spacer disks which can be placed on the bottom of the pressure valve closing member. Moreover, by a choice of the spring constant, the opening pressure for the pressure valve closing member and for the check valve can be determined.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
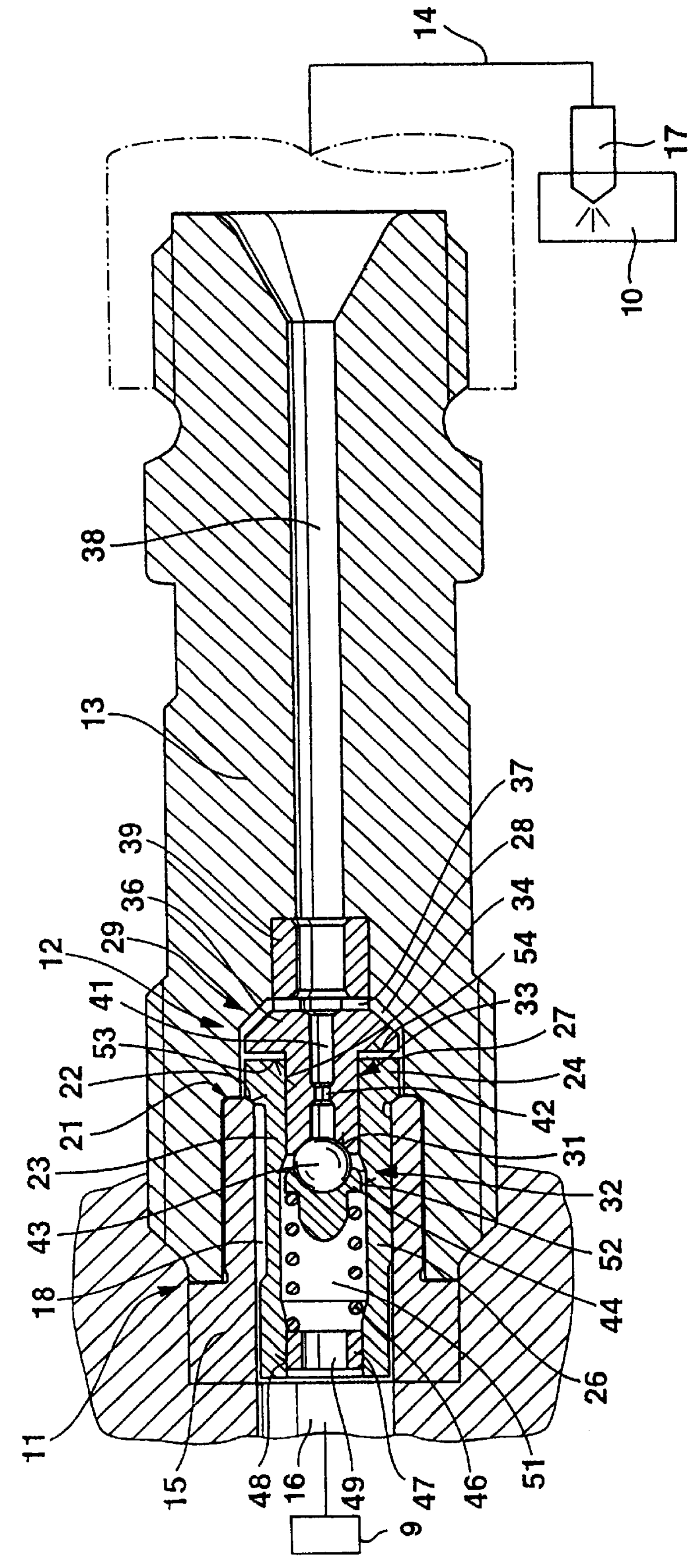
FIG. 1 is a longitudinal section through a first exemplary embodiment of a pressure valve, embodied as an equal-pressure valve, having a through conduit in the pressure valve closing member, which conduit, on its end toward the injection site, has a check valve that is axially movable in the pressure valve closing member.

FIG. 1 shows a longitudinal section through a pressure valve 11 functioning as an equal-pressure valve, which is inserted into a stepped, through bore 12 of a valve housing, forming a tubular neck; the valve housing in turn is threaded into a housing, not shown, of a fuel injection pump. The pressure valve 11 is disposed in a supply line 14 between a pump work chamber 16, shown only in part, of the fuel injection pump and an injection site 17 in the form of an injection valve into the combustion chamber of the internal combustion engine to be supplied, which is also not shown; the valve housing 13 forms part of this supply line 14.

The pressure valve 11 also comprises a tubular valve body 15, which is retained in a receiving bore of the fuel injection pump by the tubular neck, which is formed by part of the valve housing 13 and is threaded from outside into the receiving bore and in its interior has a through conduit 18, in the form of an axial bore, which forms part of the stepped bore 12 and communicates with the through conduit 18 that leads to the pump work chamber 16 of the injection pump. The valve body 15, on its end remote from the pump work chamber 16, has a conical valve seat 21, on which a conical sealing face 22 of a pressure valve closing member 23 of the pressure valve 11 comes to rest. The conical sealing face 22 is disposed on a shoulder 24 of the pressure valve closing member 23, which has a larger diameter than a shaft 26, disposed in the through conduit 18, of the pressure valve closing member 23. The shaft 26 is advantageously embodied as a square shaft. The shoulder 24 of the pressure valve closing member 23 is embodied as smaller in turn than the diameter of the through conduit 18, so that an annular gap 27 is formed which on the injection side adjoins the valve seat 21. The annular gap 27 merges with a conical annular gap 28, which is formed by the through conduit 18 and a piston 29 that has a valve seat 31, toward the pump chamber, of a check valve 32 disposed in the pressure valve closing member 23. The piston 29 has a guide portion 33, which is guided in a bore 34 of the pressure valve closing member 23, which is embodied in the region of the valve seat 21. A conical head portion 36, which forms the conical annular gap 28 in the through conduit 18, is disposed on the injection side on the guide portion 33 of the piston 29. On the side toward the injection site, the head portion 36 has a cross-slotted stop 37, which creates a passageway between the conical annular gap 28 and a longitudinal bore portion 38 of the stepped bore 12. The stop 37 comes to rest on a stop bush 39, which is inserted in the transitional region of the stepped bore 12 between the through conduit 18 and the longitudinal bore portion 38.

In the piston 29 of the check valve 32, coaxially with the stepped bore 12, a through bore 41 is provided, which has a throttle restriction 42 with a narrowed cross-sectional region. Viewed in the direction of the pump work chamber 16, the through bore 41 discharges onto a valve closing member 43 in the form of a ball that rests on the valve seat 31. The valve closing member 43 is received by a spring plate 44, which is engaged by a restoring spring 46, as a result of which the valve closing member 43 is acted upon and pressed to the valve seat 31. The restoring spring 46, engaging the spring plate 44 on the side toward the injection site, is braced toward the pump chamber on a clamping bush 47, which is press-fitted into a through opening 48 in the pressure valve closing member 23. The clamping bush 47 has a bore 49, as a result of which a work chamber 51 disposed in the pressure valve closing member 23 communicates with the pump work chamber 16.

The spring plate 44 of the check valve 32 is smaller in diameter than the work chamber 51, so that an intervening annular gap 52 is formed, which makes it possible for the return-flowing medium to flow from the injection site 17, past the valve closing member 43 via the through bore 41, into the work chamber 51 and then to flow out into the pump work chamber 16.

The pressure valve according to the invention, as shown in FIG. 1, functions as follows:

In the operation of a fuel injection pump in which the above-described pressure valve 11 is installed, fuel is pumped from the pump work chamber 16 to the injection site 17 of the engine. Under the pressure of the fuel flowing out of the pump work chamber 16, the pressure valve closing member 23 is lifted from the valve seat 21 of the valve body 15, and as a result the pressure valve 11 opens, and the fuel can flow from the through conduit 18, past the valve seat 21, into the annular gap 27. The opening motion of the pressure valve closing member 23 is limited by the fact that a stop face 53 of the shoulder 24 comes to rest on a preferably parallel and facing stop face 54 of the piston 29; the stop face 54 is formed by the head portion 36, whose diameter is enlarged compared with the guide portion 33. The fuel flows via the annular gap 27 into the conical annular gap 28, and via the cross-slotted stop 37 and the stop bush 39 flows into the longitudinal bore portion 38 and is fed via the supply line 14 to the injection site 17.

At the end of fuel supply, the supply pressure of the fuel drops, and as a result the force of the oncoming fuel no longer suffices to keep the pressure valve closing member 23 open counter to the force of the restoring spring 23; as a result, the pressure valve closing member 23 returns to its valve seat 21, and the pressure valve 11 closes. Following this sudden interruption in supply, pressure waves move back and forth in the enclosed volume between the pressure valve 11 and the injection site 17. To avert a resultant after-injection at the injection site 17, the pressure level of the peak pressure wave pressures in the supply line 14 is reduced down to a predetermined amount via the check valve 32, in that the fuel moves the piston 29 of the check valve toward the pump work chamber 16 by an amount that is defined by the spacing of the stop face 53 of the pressure valve closing member 23 from the stop face 54 of the piston 29. This motion of the piston 29 relative to the pressure valve closing member 23 is brought about by the throttle restriction 42 in the piston 29. After that, the pressure, which is effected by the diversion shaft, backs up at the valve closing member 43, thereby opening the valve closing member. The restoring spring 46 is urged in the direction of the pump work chamber 16, and the valve closing member 43 lifts away from the valve seat 31 of the piston 29. The fuel flows past the valve closing member 43 into the annular gap 52 and reaches the work chamber 51. After flowing through the spring windings of the restoring spring 46 in the work chamber 51, the fuel flows out of the pressure valve 11 into the injection pump, via the bore 49 of the clamping bush 47. As soon as the opening pressure of the check valve 32 is undershot, the valve closing member 43 is returned by the restoring spring 46 to the valve seat 31 of the check valve.

The opening pressures of the pressure valve 11 and of the check valve 32 are adjusted via the position of the clamping bush 47, press-fitted in the pressure valve closing member 23, and via the spring constant of the restoring spring 46.

By means of the embodiment of the invention shown in FIG, 1, an equal-pressure valve is formed, in which by means of a restoring spring 46 the opening pressure of both the pressure valve 11 and the check valve 32 can be triggered. Thus a simple pressure valve-controlled high-pressure relief can be created, substantially reducing the idle volume. The energy required for generating the high pressure can be reduced thereby, so that in turn a fast buildup of the high pressure is made possible.

Figure 2:
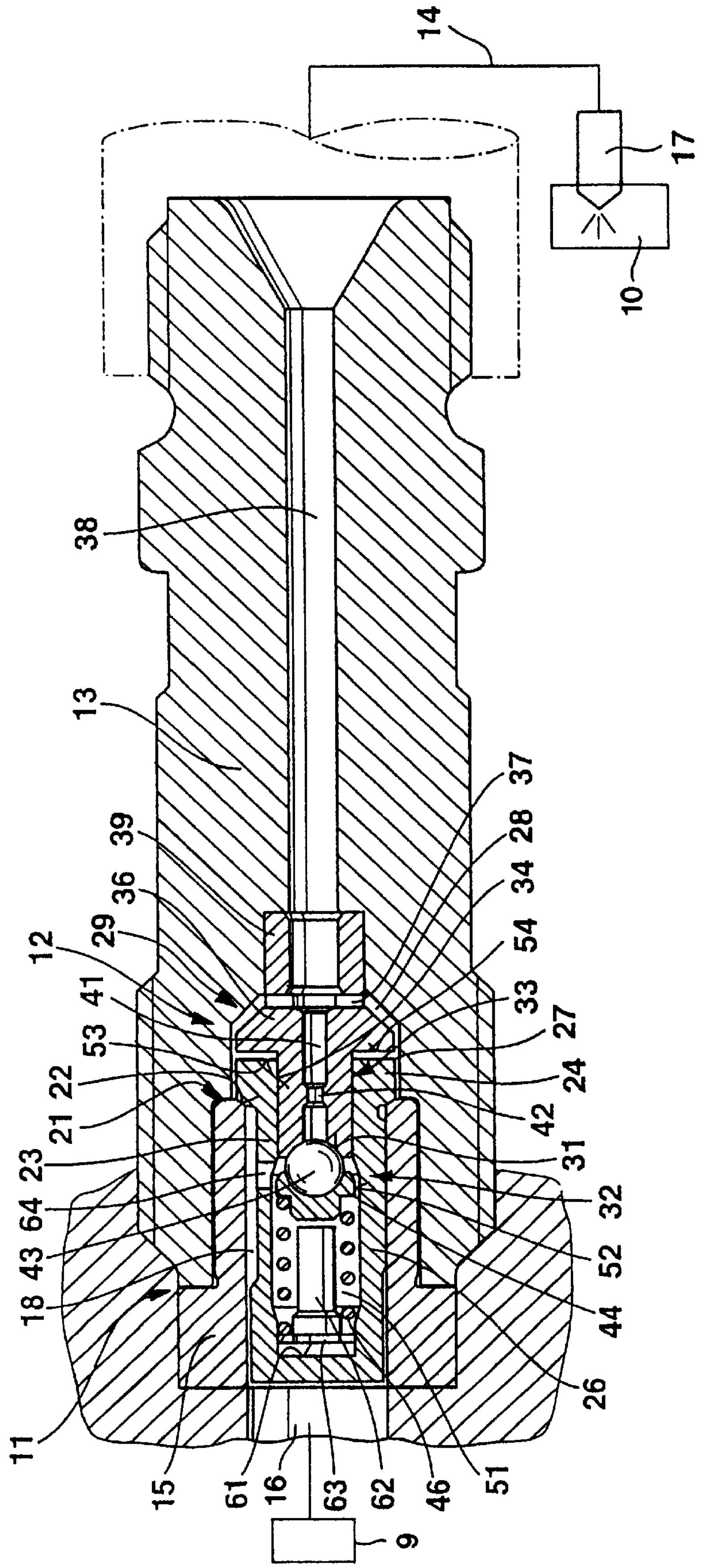
FIG. 2 is a longitudinal section through a first exemplary embodiment of a pressure valve, embodied as an equal-pressure valve, with what compared to FIG. 1 is an alternative return flow into the pump work chamber, because of the pressure valve closing member.

FIG. 2 shows an alternative embodiment to FIG. 1. The embodiment shown in FIG. 2 is distinguished from the first exemplary embodiment in how the pressure valve closing member 23 is embodied. It is cup-shaped and has a housing bottom 61, on which the restoring spring 46 rests, toward the pump work chamber. A reciprocation stop 62, which points in the direction of the spring plate 44, is also disposed on the housing bottom 61. As a result, when pressure is exerted on the check valve 32 a limited opening motion is induced, whereupon the spring plate 44 rests on the reciprocation stop 62. To adjust the opening pressure of the check valve 32, at least one spacer disk 63 may be disposed between the restoring spring 46 and the housing bottom 61, as a result of which the initial prestressing of the restoring spring 46 can be adjusted.

On its shaft 26, in the region of the check valve 32, the pressure valve closing member 23 has at least one opening 64, which forms a communication between the work chamber 51 of the pressure valve closing member 23 and the through conduit 18. Advantageously, a plurality of openings 64 are distributed, radially evenly, over the circumference of the shaft 25.

This alternative embodiment according to the invention of the pressure valve functions as follows:

In operation of a fuel injection pump for supplying fuel to the injection site 17 of the engine, the description made in conjunction with FIG. 1 again applies.

After the end of fuel supply, when the feed pressure of the fuel drops, the flow course of the returning fuel deviates from the embodiment of FIG. 1. The pressure applied to the check valve 32 opens the check valve 32, and as a result the fuel can flow past the valve closing member 43 and via the opening 64 or openings 64 into the through conduit 18 from whence it can be returned to the pump work chamber 16. The valve closing member 43 at this time rests along with the spring plate 44 on the reciprocation stop 62. As soon as the pressure applied to the check valve 32 drops again, the valve closing member 43 returns to the valve seat 31.

This altered flow course effected by the exemplary embodiment of FIG. 2, and the reciprocation stop 62, have the advantage of improving the durability of restoring spring 46. At the same time, this embodiment also has the advantage of a reduced idle volume, and as a result the energy demand for generating the high pressure can be reduced. Moreover, the advantages already described for the exemplary embodiment of FIG. 1 are equally applicable to the exemplary embodiment described in conjunction with FIG. 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A pressure valve for installation in a supply line (14) between a pump work chamber (16) of a fuel injection pump and an injection site (17), in an internal combustion engine to be supplied thereby, comprising a valve body (15) which is provided with a first valve seat (21), a through conduit (18) in which a first pressure valve closing member (23) is guided, said first valve closing member opens toward the injection site (17) counter to a force of a restoring spring (46); a check valve (32) in the work chamber (51) of the first pressure valve closing member, said check valve opens toward the pump work chamber (16); said check valve includes a second closing member (43), which closes a second valve seat (31) toward the injection valve by means of said restoring spring (46) supported on the second valve closing member (43), the check valve (22) and the first pressure valve closing member (23) are disposed, movable relative to one another in the through conduit (18), and the restoring spring (46) on a side toward the injection site forces the check valve (32), disposed displaceably in the first pressure valve closing member (23), into contact with a second valve seat (31) on a stationary arranged part (29) through which passes a stepped through bore (12) from said second valve seat (31) leading to the injection site (17) and on a side toward the pump chamber disposes the first pressure valve closing member (23) to the valve seat (21) of the valve body (15).

2. A pressure valve in accordance with claim 1, in which the second valve seat (31) of the check valve (32) is disposed toward the pump chamber on a piston (29) which has a guide portion (33) disposed in the first pressure valve closing member (23).

3. A pressure valve in accordance with claim 2, in which the piston (29) has a conically embodied head portion (36) which adjoins the guide portion (33) on the injection side and is enlarged in diameter compared with the guide portion.

4. A pressure valve in accordance with claim 3, in which a stop face (54) is embodied between the guide portion (33) and the head portion (36) of the piston (29) and extends at right angles to a valve axis and is disposed spaced apart from a parallel stop face (53) of the pressure valve closing member (23).

5. A pressure valve in accordance with claim 2, in which the piston (29) has a through bore (41), in which a throttle restriction (42) is disposed.

6. A pressure valve in accordance with claim 2, in which a transitional region between a through conduit (18) and a longitudinal bore portion (38) of smaller diameter, the stepped bore (12) disposed in a valve housing (13) has a stop bush (39), on which the piston (29) may rest.

7. A pressure valve in accordance with claim 3, in which a slotted stop (37) with a cross-shaped slot is provided on the injection side of the head portion (36) of the piston (29).

8. A pressure valve in accordance with claim 1, in which the first pressure valve closing member (23) is tubular and, on a through opening (48) disposed toward the pump chamber, has an inserted, press-fitted clamping bush (47), on which the restoring spring (46) rests on the side toward the pump chamber.

9. A pressure valve in accordance with claim 3, in which the first pressure valve closing member (23) is tubular and, on a through opening (48) disposed toward the pump chamber, has an inserted, press-fitted clamping bush (47), on which the restoring spring (46) rests on the side toward the pump chamber.

10. A pressure valve in accordance with claim 5, in which the first pressure valve closing member (23) is tubular and, on a through opening (48) disposed toward the pump chamber, has an inserted, press-fitted clamping bush (47), on which the restoring spring (46) rests on the side toward the pump chamber.

11. A pressure valve in accordance with claim 6, in which the first pressure valve closing member (23) is tubular and, on a through opening (48) disposed toward the pump chamber, has an inserted, press-fitted clamping bush (47), on which the restoring spring (46) rests on the side toward the pump chamber.

12. A pressure valve in accordance with claim 8, in which the opening pressures of the pressure valve (11) and of the check valve (32) are adjustable by means of a spacing of the clamping bush (47) and a spring plate (44) of the valve closing member (43).

13. A pressure valve in accordance with claim 1, in which the first pressure valve closing member (23) is cup-shaped, and the restoring spring (46) toward the pump chamber rests on the housing bottom (61) of the pressure valve closing member (23).

14. A pressure valve in accordance with claim 3, in which the first pressure valve closing member (23) is cup-shaped, and the restoring spring (46) toward the pump chamber rests on the housing bottom (61) of the pressure valve closing member (23).

15. A pressure valve in accordance with claim 6, in which the first pressure valve closing member (23) is cup-shaped, and the restoring spring (46) toward the pump chamber rests on the housing bottom (61) of the pressure valve closing member (23).

16. A pressure valve in accordance with claim 7, in which the first pressure valve closing member (23) is cup-shaped, and the restoring spring (46) toward the pump chamber rests on the housing bottom (61) of the pressure valve closing member (23).

17. A pressure valve in accordance with claim 13, in which a stop (62) of the valve closing member (32), disposed in the direction of the check valve (32), is disposed on the housing bottom (61) of the pressure valve closing member (23).

18. A pressure valve in accordance with claim 14, in which a stop (62) of the valve closing member (32), disposed in the direction of the check valve (32), is disposed on the housing bottom (61) of the pressure valve closing member (23).

19. A pressure valve in accordance with claim 13, in which the first pressure valve closing member (23), in a shaft (26), has at least one opening (64) which is disposed in a working range (51) of the check valve (32).

20. A pressure valve in accordance with claim 13, in which the opening pressures of the pressure valve (11) and of the check valve (23) are adjustable by means of spacer elements (63) which can be disposed on the housing bottom.

* * * * *